United States Patent
Hayama et al.

(10) Patent No.: US 11,536,257 B2
(45) Date of Patent: Dec. 27, 2022

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Takahiro Ejima, Tokyo (JP); Daichi Kurihara, Tokyo (JP); Wataru Takahashi, Tokyo (JP); Keigo Shirafuji, Tokyo (JP); Yoshihiro Ogawa, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/256,959

(22) PCT Filed: Jul. 9, 2019

(86) PCT No.: PCT/JP2019/027071
§ 371 (c)(1),
(2) Date: Dec. 29, 2020

(87) PCT Pub. No.: WO2020/013154
PCT Pub. Date: Jan. 16, 2020

(65) Prior Publication Data
US 2021/0131413 A1 May 6, 2021

(30) Foreign Application Priority Data
Jul. 12, 2018 (JP) .............................. JP2018-132687

(51) Int. Cl.
*F04B 27/18* (2006.01)
*F04B 49/12* (2006.01)
*F16K 11/24* (2006.01)

(52) U.S. Cl.
CPC .......... *F04B 27/1804* (2013.01); *F04B 27/18* (2013.01); *F04B 49/12* (2013.01);
(Continued)

(58) Field of Classification Search
CPC .......... F04B 27/1804; F04B 2027/1822; F04B 2027/1831; F04B 2027/1859; F16K 11/24; F16K 31/0603
See application file for complete search history.

(56) References Cited

U.S. PATENT DOCUMENTS

| 6,010,312 A | 1/2000 | Suitou et al. ............. F04B 1/26 |
| 6,354,811 B1 | 3/2002 | Ota et al. .................. 417/222.2 |

(Continued)

FOREIGN PATENT DOCUMENTS

| EP | 1081378 | 3/2001 | ............. F04B 27/18 |
| EP | 2594794 | 5/2013 | ............. F04B 27/18 |

(Continued)

OTHER PUBLICATIONS www.lexico.com/en/definition/connected accessed Aug. 15, 2022 (Year: 2022).*

(Continued)

*Primary Examiner* — Devon C Kramer
*Assistant Examiner* — Joseph S. Herrmann
(74) *Attorney, Agent, or Firm* — Hayes Soloway P.C.

(57) ABSTRACT

A capacity control valve includes a CS valve which opens and closes a communication between the control fluid and the suction fluid by the movement of rods and an urging member configured to urge the primary valve body and the rods in opposite directions and the primary valve body and the rods are disposed so as to be relatively movable in an axial direction.

17 Claims, 8 Drawing Sheets

(52) U.S. Cl.
CPC ....... *F16K 11/24* (2013.01); *F04B 2027/1822* (2013.01); *F04B 2027/1831* (2013.01); *F04B 2027/1859* (2013.01)

(56) References Cited

U.S. PATENT DOCUMENTS

| | | | |
|---|---|---|---|
| 6,358,017 B1 | 3/2002 | Ota et al. | 417/222.2 |
| 6,361,283 B1 | 3/2002 | Ota et al. | 417/222.2 |
| 6,485,267 B1 | 11/2002 | Imai et al. | F04B 1/26 |
| 8,021,124 B2 | 9/2011 | Umemura et al. | 417/222.2 |
| 8,079,827 B2 | 12/2011 | Iwa et al. | 417/222.2 |
| 9,732,874 B2* | 8/2017 | Saeki | F04B 27/1804 |
| 9,777,863 B2 | 10/2017 | Higashidozono | F04B 27/1804 |
| 11,053,933 B2 | 7/2021 | Warren | F04B 27/1804 |
| 11,085,431 B2 | 8/2021 | Fukudome | F04B 27/18 |
| 11,156,301 B2 | 10/2021 | Hayama | F16K 31/0627 |
| 2004/0060604 A1 | 4/2004 | Uemura et al. | 137/595 |
| 2005/0035321 A1 | 2/2005 | Uemura | F16K 27/041 |
| 2005/0287014 A1 | 12/2005 | Umemura | F04B 27/1804 |
| 2006/0218953 A1 | 10/2006 | Hirota | 62/228.5 |
| 2007/0214814 A1 | 9/2007 | Umemura et al. | 62/228.1 |
| 2008/0138213 A1* | 6/2008 | Umemura | F04B 27/1804 |
| | | | 137/625.65 |
| 2009/0108221 A1* | 4/2009 | Umemura | F04B 27/1804 |
| | | | 251/129.15 |
| 2009/0183786 A1 | 7/2009 | Iwa et al. | 137/487.5 |
| 2012/0198992 A1 | 8/2012 | Futakuchi et al. | 91/505 |
| 2012/0198993 A1 | 8/2012 | Fukudome et al. | F04B 27/18 |
| 2013/0126017 A1 | 5/2013 | Ota et al. | F04B 27/1804 |
| 2014/0130916 A1 | 5/2014 | Saeki | F04B 27/1804 |
| 2015/0004010 A1 | 1/2015 | Saeki | F04B 27/1804 |
| 2015/0068628 A1 | 3/2015 | Iwa et al. | F16K 31/06 |
| 2015/0211506 A1 | 7/2015 | Shirafuji et al. | F04B 27/1804 |
| 2015/0345655 A1 | 12/2015 | Higashidozono et al. | |
| | | | F16K 31/0624 |
| 2016/0290326 A1 | 10/2016 | Sugamura | F04B 27/1804 |
| 2017/0175726 A1 | 6/2017 | Kume | F04B 27/1804 |
| 2017/0028462 A1 | 10/2017 | Hayama et al. | F16K 47/06 |
| 2017/0284562 A1 | 10/2017 | Hayama et al. | F16K 47/06 |
| 2017/0356430 A1 | 12/2017 | Irie et al. | F04B 27/1804 |
| 2018/0291888 A1 | 10/2018 | Tonegawa | F16K 31/0624 |
| 2020/0362974 A1* | 11/2020 | Hayama | F04B 49/22 |
| 2021/0285433 A1 | 9/2021 | Hayama | F04B 27/1804 |
| 2022/0034414 A1 | 2/2022 | Ito | F04B 27/18 |

FOREIGN PATENT DOCUMENTS

| | | | |
|---|---|---|---|
| EP | 2 784 320 | 10/2014 | F04B 27/18 |
| EP | 3 431 760 | 1/2019 | F04B 27/18 |
| JP | 5-306679 | 11/1993 | F04B 27/08 |
| JP | 6-200875 | 7/1994 | F04B 27/08 |
| JP | 7-27049 | 1/1995 | F04B 27/10 |
| JP | 9-144929 | 6/1997 | F16K 31/06 |
| JP | 2000-345961 | 12/2000 | F04B 27/14 |
| JP | 2001-73939 | 3/2001 | F04B 27/14 |
| JP | 2001-132632 | 5/2001 | F04B 27/14 |
| JP | 2003-42062 | 2/2003 | F04B 27/14 |
| JP | 2006-52648 | 2/2006 | F04B 27/14 |
| JP | 2006-307828 | 11/2006 | F04B 27/14 |
| JP | 2007-247512 | 9/2007 | F04B 27/14 |
| JP | 2008-14269 | 1/2008 | F04B 27/14 |
| JP | 2008-202572 | 9/2008 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 5167121 | 12/2012 | F04B 27/14 |
| JP | 2014-118939 | 6/2014 | F04B 27/14 |
| JP | 5557901 | 6/2014 | F04B 27/14 |
| JP | 2014-190247 | 10/2014 | F04B 27/14 |
| JP | 2016-196876 | 11/2016 | F04B 27/18 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-21646 | 2/2018 | F16K 31/06 |
| JP | 2018-40385 | 3/2018 | F16K 31/06 |
| JP | 2018-145877 | 9/2018 | F04B 39/14 |
| JP | 2019-2384 | 1/2019 | F04B 27/18 |
| WO | WO 2007/119380 | 10/2007 | F04B 27/14 |
| WO | WO2011021789 | 2/2011 | F04B 27/14 |
| WO | WO2011135911 | 11/2011 | F04B 27/14 |
| WO | WO2013109005 | 7/2013 | F04B 49/06 |
| WO | WO2013176012 | 11/2013 | F04B 27/14 |
| WO | WO 2014/091975 | 6/2014 | F04B 27/14 |
| WO | WO 2014/119594 | 8/2014 | F04B 27/14 |
| WO | WO2016104390 | 6/2016 | F16K 31/06 |
| WO | WO 2017/057160 | 4/2017 | F04B 27/18 |
| WO | WO 2017/159553 | 9/2017 | F04B 27/18 |
| WO | WO2018207461 | 11/2018 | F04B 27/18 |
| WO | WO2019167912 | 9/2019 | F04B 27/18 |

OTHER PUBLICATIONS

International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
U.S. Official Action issued in related U.S. Appl. No. 17/259,138, dated Jan. 18, 2022, 14 pages.
Notice of Allowance issued in related U.S. Appl. No. 17/287,086, dated Feb. 2, 2022, 7 pages.
U.S. Appl. No. 17/259,138, filed Jan. 8, 2021, Hayama et al.
U.S. Appl. No. 17/258,708, filed Jan. 7, 2021, Hayama et al.
U.S. Appl. No. 17/258,692, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.
U.S. Appl. No. 16/962,786, filed Jul. 16, 2020, Hayama et al.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.

(56) References Cited

OTHER PUBLICATIONS

International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Whitten Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
U.S. Appl. No. 17/256,953, filed Dec. 29, 2020.
U.S. Appl. No. 17/299,285, filed Jun. 2, 2021.
U.S. Appl. No. 17/256,959, filed Dec. 29, 2020.
U.S. Appl. No. 17/287,086, filed Apr. 20, 2021.
U.S. Appl. No. 17/417,701, filed Jun. 23, 2021.
U.S. Appl. No. 17/258,692, filed Jan. 7, 2021.
U.S. Appl. No. 17/256,955, filed Dec. 29, 2020.
U.S. Appl. No. 17/433,558, filed Aug. 24, 2021.
U.S. Appl. No. 17/256,947, filed Dec. 29, 2020.
U.S. Appl. No. 17/258,708, filed Jan. 7, 2021.
U.S. Appl. No. 17/259,138, filed Jan. 8, 2021.
U.S. Appl. No. 17/600,547, filed Sep. 30, 2021.
U.S. Appl. No. 17/599,539, filed Sep. 28, 2021.
U.S. Official Action issued in related U.S. Appl. No. 17/299,285, dated Mar. 31, 2022, 11 pages.
Chinese Action issued in related application serial No. 201980044409.4, dated Jan. 26, 2022, with translation, 10 pgs.
Chinese Aciton issued in related application serial No. 201980044138.2, dated Mar. 30, 2022, with translation, 9 pgs.
Chinese Action issued in related application serial No. 201980044077.x, dated Apr. 3, 2022, with translation, 11 pgs.
Chinese Action issued in related application serial No. 201980046798.4, dated Apr. 6, 2022, with translation, 8 pgs.
Chinese Official Action issued in related application serial No. 201980046750.3, dated Apr. 27, 2032, with translation, 10 pages.
Chinese Official Action issued it related application serial No. 201980047614.6, dated Apr. 26, 2022, with translation, 9 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
European Search Report issued in related application serial No. 19831028.4, dated Apr. 7, 2022, 8 pages.
European Search Report issued in related application serial No. 19894059.5, dated Jun. 7, 2022, 4 pages.
European Search Report issued in related application serial No. 19883191.5, dated May 23, 2022, 5 pages.
U.S. Official Action issued in related U.S. Appl. No. 17/256,953, dated Apr. 15, 2022, 18 pages.
U.S. Official Action issued in related U.S. Appl. No. 17/259,138, dated Mar. 31, 2022, 5 paees.
U.S. Official Action issued in related U.S. Appl. No. 17/256,955, dated Feb. 18, 2022, 19 pages.
U.S. Official Action issued in related U.S. Appl. No. 17/259,138, dated Jan. 19, 2022, 6 pages.
U.S. Official Action issued in related U.S. Appl. No. 17/433,558, dated May 25, 2022, 11 pages.

* cited by examiner

CAPACITY CONTROL VALVE

TECHNICAL FIELD

The present invention relates to a capacity control valve for variably controlling a capacity of a working fluid and relates to, for example, a capacity control valve for controlling a discharge amount of a variable displacement compressor used in an air conditioning system of an automobile in response to a pressure.

BACKGROUND ART

A variable displacement compressor used in an air conditioning system of an automobile or the like includes a rotating shaft rotationally driven by an engine, a swash plate connected to the rotating shaft so that an inclination angle is variable, a compression piston connected to the swash plate, and the like and changes the inclination angle of the swash plate so that a stroke amount of the piston is changed to control a discharge amount of a fluid. The inclination angle of the swash plate can be changed continuously by appropriately controlling a pressure inside a control chamber, by using a capacity control valve driven to be opened and closed by an electromagnetic force, while using a suction pressure Ps of a suction chamber sucking a fluid, a discharge pressure Pd of a discharge chamber discharging a fluid pressurized by the piston, and a control pressure Pc of the control chamber accommodating the swash plate.

When the variable displacement compressor is driven continuously (hereinafter, simply referred to as a "continuous driving state"), the capacity control valve is energized and controlled by a control computer and performs normal control in which a valve body is moved in the axial direction by an electromagnetic force generated in a solenoid and a primary valve is opened and closed so as to adjust a control pressure Pc of the control chamber of the variable displacement compressor.

During normal control of the capacity control valve, the pressure of the control chamber of the variable displacement compressor is appropriately controlled and the inclination angle of the swash plate with respect to the rotating shaft is continuously changed to change the stroke amount of the piston so that the discharge amount of the fluid with respect to the discharge chamber is controlled and the air conditioning system is adjusted to have desired cooling capacity. Further, when the variable displacement compressor is driven with a maximum capacity, the primary valve of the capacity control valve is closed so as to decrease the pressure of the control chamber. Accordingly, the inclination angle of the swash plate becomes maximal.

Further, there is known a method of improving responsiveness of the variable displacement compressor by forming an auxiliary communication path which communicates a control port and a suction port of the capacity control valve with each other, discharging a refrigerant of the control chamber of the variable displacement compressor to the suction chamber of the variable displacement compressor through the control port, the auxiliary communication path, and the suction port at startup, and promptly decreasing the pressure of the control chamber at startup (see Patent Citation 1).

CITATION LIST

Patent Literature

Patent Citation 1: JP 5167121 B2 (Page 7, FIG. 2)

SUMMARY OF INVENTION

Technical Problem

However, in Patent Citation 1, a fluid discharge function is excellent at startup, but the auxiliary communication path is in a communication state so that a refrigerant flows from the control port into the suction port when the variable displacement compressor is continuously driven. As a result, there is concern that the controllability of the pressure of the control chamber is poor and the operation efficiency of the variable displacement compressor is deteriorated.

The present invention has been made in view of such problems and an object of the present invention is to provide a capacity control valve having good operation efficiency while having a fluid discharge function at startup.

Solution to Problem

In order to solve the foregoing problems, a capacity control valve according to the present invention is a capacity control valve including a valve housing provided with a discharge port allowing a discharge fluid of a discharge pressure to pass therethrough, a suction port allowing a suction fluid of a suction pressure to pass therethrough, and a control port allowing a control fluid of a control pressure to pass therethrough, a rod driven by a solenoid, and a primary valve including a primary valve seat and a primary valve body and opening and closing a communication between the discharge port and the control port by the movement of the rod. The capacity control valve further includes a CS valve which opens and closes a communication between the control port and the suction port by the movement of the rod and an urging member configured to urge the primary valve body and the rod in opposite directions, and the primary valve body and the rod are disposed so as to be relatively movable in an axial direction. According to the aforesaid characteristic, since the primary valve body is disposed so as to be movable with respect to the rod, the primary valve can be controlled while the CS valve is closed. Further, the control pressure and the suction pressure can be maintained at the equal pressure (i.e., the same pressure) in such a manner that the rod opens the CS valve so as to communicate the control port with the suction port when the primary valve is closed in a startup state and a maximum energized state. On the other hand, the control fluid can be prevented from flowing into an introduction area of the suction fluid in such a manner that the CS valve is closed so as to interrupt a communication between the control port and the suction port when the primary valve is controlled in an energized state. In this way, it is possible to improve the discharge and operation efficiency of the liquid refrigerant when starting the variable displacement compressor.

It may be preferable that the primary valve body is provided with a locking portion configured to lock a relative movement of the rod with respect to the primary valve body in the axial direction. According to this configuration, the valve body can be accurately positioned in the axial direction with respect to the rod by the locking portion.

It may be preferable that the CS valve is a spool valve structure. According to this configuration, since the spool valve structure is provided, the CS valve is in a closed state when the rod is stroked by a predetermined amount or more in the axial direction and hence the CS valve can be reliably closed.

It may be preferable that each of the primary valve body and the rod may be provided with a contact portion which contacts in the axial direction. According to this configuration, the maximum opening degree of the CS valve can be adjusted.

It may be preferable that an inner periphery of the primary valve body may slide on the rod and an outer periphery thereof may slide on the valve housing. According to this configuration, the relative movement between the primary valve body and the rod in the axial direction can be stabilized.

It may be preferable that the rod may be provided with a spring receiving portion with which one end of the urging member is brought into contact. According to this configuration, a slide structure of the primary valve body with respect to the rod can be simple.

It may be preferable that the capacity control valve may further include a pressure drive valve which is opened and closed by the suction pressure and the rod may be provided with a hollow communication path capable of causing the control port to communicate with the suction port by opening and closing the pressure drive valve. According to this configuration, since a refrigerant can be discharged also by the pressure drive valve at the startup, the refrigerant can be promptly discharged.

It may be preferable that the control port may include a first control port and a second control port and that the suction port, the second control port, the discharge port, and the first control port may be sequentially disposed from a side of the solenoid. According to this configuration, since the suction port and the second control port are adjacent to each other, the capacity control valve with the CS valve has a simple structure.

DESCRIPTION OF EMBODIMENTS

Modes for implementing a capacity control valve according to the present invention will be described on the basis of embodiments.

Embodiments

A capacity control valve according to an embodiment will be described with reference to FIGS. 1 to 7. Hereinafter, the left and right sides as viewed from the front side in FIG. 2 will be described as the left and right sides of the capacity control valve.

A capacity control valve V of the present invention is incorporated in a variable displacement compressor M used in an air conditioning system of an automobile or the like and variably controls a pressure of a working fluid (hereinafter, simply referred to as a "fluid") which is a refrigerant so that a discharge amount of the variable displacement compressor M is controlled to adjust the air conditioning system to a desired cooling capacity.

Figure 1:
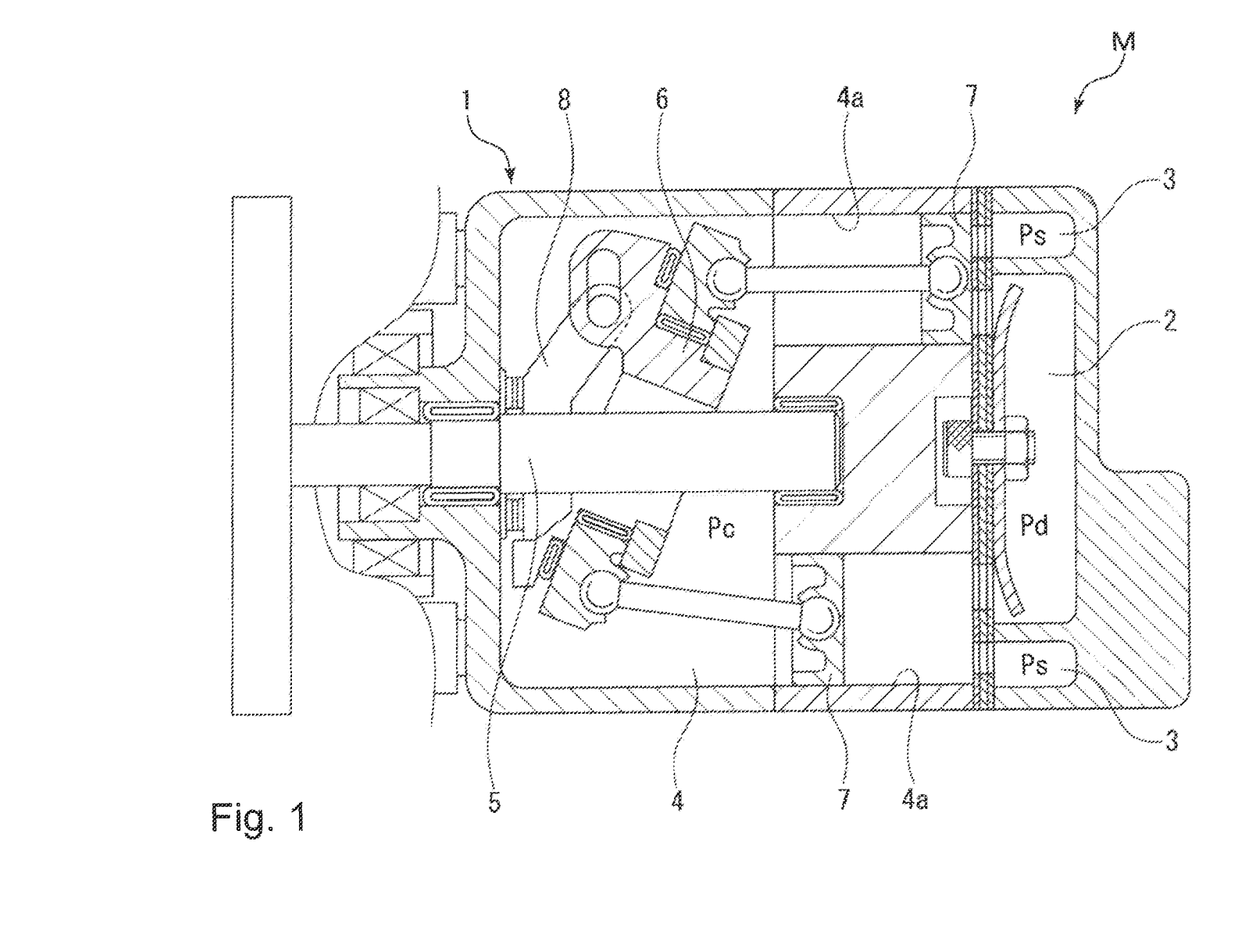
FIG. 1 is a schematic configuration diagram illustrating a swash plate type variable displacement compressor incorporated with a capacity control valve of an embodiment according to the present invention.

First, the variable displacement compressor M will be described. As illustrated in FIG. 1, the variable displacement compressor M includes a casing 1 having a discharge chamber 2, a suction chamber 3, a control chamber 4, and a plurality of cylinders 4a. In addition, the variable displacement compressor M is provided with a communication path (not illustrated) allowing the control chamber 4 and the suction chamber 3 to directly communicate with each other and this communication path is provided with a fixed orifice for adjusting a pressure between the suction chamber 3 and the control chamber 4 in a balanced state.

Further, the variable displacement compressor M includes a rotating shaft 5 which is rotationally driven by an engine (not illustrated) installed outside the casing 1, a swash plate 6 which is eccentrically connected to the rotating shaft 5 inside the control chamber 4 by a hinge mechanism 8, and a plurality of pistons 7 which are connected to the swash plate 6 and are fitted so as to be movable in a reciprocating manner inside the respective cylinders 4a and continuously changes an inclination angle of the swash plate 6 by appropriately controlling a pressure inside the control chamber 4, by using the capacity control valve V driven to be opened and closed by an electromagnetic force, while using a suction pressure Ps of the suction chamber 3 sucking a fluid, a discharge pressure Pd of the discharge chamber 2 discharging a fluid pressurized by the piston 7, and a control pressure Pc of the control chamber 4 accommodating the swash plate 6 so that a stroke amount of the piston 7 is changed to control a discharge amount of the fluid. Further, for convenience of description, the capacity control valve V incorporated in the variable displacement compressor M is omitted in FIG. 1.

Specifically, the inclination angle of the swash plate 6 with respect to the rotating shaft 5 becomes smaller so that the stroke amount of the piston 7 decreases as the control pressure Pc inside the control chamber 4 becomes higher. However, when the pressure becomes a certain level or more, the swash plate 6 is substantially perpendicular to the rotating shaft 5, that is, slightly inclined from the vertical state. At this time, since the stroke amount of the piston 7 is minimized and the pressurization of the fluid inside the cylinder 4a by the piston 7 is minimized, the discharge amount of the fluid to the discharge chamber 2 decreases and the cooling capacity of the air conditioning system is minimized. On the other hand, the inclination angle of the swash plate 6 with respect to the rotating shaft 5 becomes larger so that the stroke amount of the piston 7 increases as the control pressure Pc inside the control chamber 4 becomes lower. However, when the pressure becomes a certain level or less, the inclination angle of the swash plate 6 with respect to the rotating shaft 5 is maximized. At this time, since the stroke amount of the piston 7 is maximized and the pressurization of the fluid inside the cylinder 4a by the piston 7 is maximized, the discharge amount of the fluid to the discharge chamber 2 increases and the cooling capacity of the air conditioning system is maximized.

Figure 2:
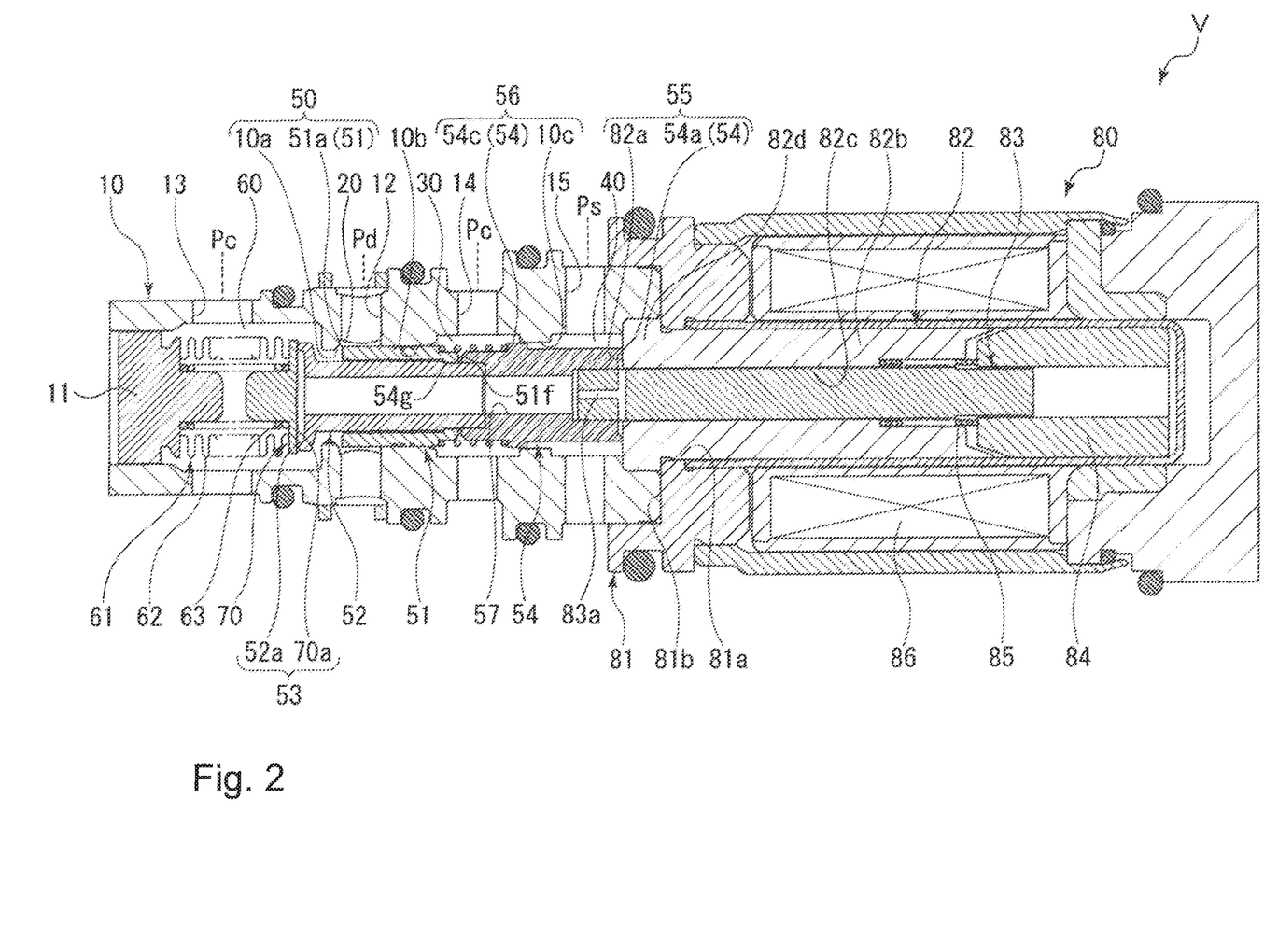
FIG. 2 is a cross-sectional view illustrating a case in which a primary valve is opened and a CS valve is closed in a non-energized state of the capacity control valve of the embodiment.

As illustrated in FIG. 2, the capacity control valve V incorporated in the variable displacement compressor M variably controls the control pressure Pc in the control chamber 4 by controlling the fluid flowing into the control chamber 4 or flowing out from the control chamber 4 in such a manner that a current flowing through a coil 86 constituting a solenoid 80 is adjusted to control the opening and closing of a primary valve 50, a sub-valve 55, and a CS valve 56 of the capacity control valve V and a pressure-sensitive body 61 is operated by the suction pressure Ps of an intermediate communication path 57 corresponding to a hollow communication path to control the opening and closing of a pressure-sensitive valve 53 corresponding to a pressure drive valve.

In the embodiment, the primary valve 50 includes a primary valve body 51 and a primary valve seat 10a formed on an inner peripheral surface of a valve housing 10 and the primary valve 50 is opened and closed when a left axial end 51a of the primary valve body 51 is brought into contact with and separated from the primary valve seat 10a. The pressure-sensitive valve 53 includes a cap 70 constituting the pressure-sensitive body 61 and a pressure-sensitive valve seat 52a formed in a left axial end of a pressure-sensitive valve member 52 corresponding to a rod and the pressure-sensitive valve 53 is opened and closed when a seal surface 70a formed on the outer radial side of the right axial end of the cap 70 is brought into contact with and separated from the pressure-sensitive valve seat 52a. The sub-valve 55 includes a sub-valve body 54 corresponding to a rod and a sub-valve seat 82a formed on the opening end surface of the fixed iron core 82, that is, the left axial end surface and the sub-valve 55 is opened and closed when a right axial end 54a of the sub-valve body 54 is brought into contact with and separated from the sub-valve seat 82a. The CS valve 56 has a spool valve structure and includes an annular convex portion 54c formed on the outer peripheral surface of the sub-valve body 54 and a CS valve seat 10c formed on an inner peripheral surface of an annular protrusion extending to the inner radial side of the valve housing 10 and the CS valve 56 is opened and closed when the annular convex portion 54c of the sub-valve body 54 is brought into contact with and separated from the CS valve seat 10c.

Next, the structure of the capacity control valve V will be described. As illustrated in FIG. 2, the capacity control valve V mainly includes the valve housing 10 which is formed of a metal material or a resin material, the primary valve body 51, the pressure-sensitive valve member 52, and the sub-valve body 54 which are disposed in the valve housing 10 so as to be movable in a reciprocating manner in the axial direction, the pressure-sensitive body 61 which applies an urging force to the pressure-sensitive valve member 52 and the sub-valve body 54 rightward in the axial direction in response to the suction pressure Ps of the intermediate communication path 57, and the solenoid 80 which is connected to the valve housing 10 and applies a drive force to the primary valve body 51, the pressure-sensitive valve member 52, and the sub-valve body 54.

As illustrated in FIG. 2, the solenoid 80 mainly includes a casing 81 which includes an opening portion 81a opening to the left side in the axial direction, a substantially cylindrical fixed iron core 82 which is inserted into the opening portion 81a of the casing 81 from the left side in the axial direction and is fixed to the inner radial side of the casing 81, a drive rod 83 which is disposed on the inner radial side of the fixed iron core 82 so as to be movable in a reciprocating manner in the axial direction so that the left axial end portion is connected and fixed to the sub-valve body 54, a movable iron core 84 which is fixed to the right axial end portion of the drive rod 83, a coil spring 85 which is provided between the fixed iron core 82 and the movable iron core 84 and urges the movable iron core 84 rightward in the axial direction, and an excitation coil 86 which is wound on the outside of the fixed iron core 82 with a bobbin interposed therebetween.

The casing 81 is provided with a concave portion 81b of which an inner radial side of a left axial end is recessed rightward in the axial direction and a right axial end portion of the valve housing 10 is inserted and fixed to the concave portion 81b in a substantially sealed state.

The fixed iron core 82 is formed of a rigid body corresponding to a magnetic material such as iron or silicon steel and includes a cylindrical portion 82b which is provided with an insertion hole 82c extending in the axial direction so that the drive rod 83 is inserted therethrough and an annular flange portion 82d which extends outward in the radial direction from the outer peripheral surface of the left axial end portion of the cylindrical portion 82b and a sub-valve seat 82a is formed on a left axial end surface of the cylindrical portion 82b.

As illustrated in FIG. 2, the valve housing 10 is provided with a Pd port 12 which corresponds to a discharge port communicating with the discharge chamber 2 of the variable displacement compressor M, a first Pc port 13 which corresponds to a control port and a first control port communicating with the control chamber 4 of the variable displacement compressor M, a second Pc port 14 which corresponds to a control port and a second control port communicating with the control chamber 4 of the variable displacement compressor M and is adjacent to the right side of the Pd port 12 in the axial direction, and a Ps port 15 which corresponds to a suction port communicating with the suction chamber 3 of the variable displacement compressor M.

Further, the valve housing 10 is formed in a bottomed cylindrical shape by press-inserting a partition adjustment member 11 into the left axial end portion in a substantially sealed state. Additionally, the partition adjustment member 11 can adjust the urging force of the pressure-sensitive body 61 by adjusting the installation position of the valve housing 10 in the axial direction.

The primary valve body 51, the pressure-sensitive valve member 52, and the sub-valve body 54 are disposed in the valve housing 10 so as to be movable in a reciprocating manner in the axial direction and a part of the inner peripheral surface of the valve housing 10 is provided with a small-diameter guide surface 10b on which the outer peripheral surface of the primary valve body 51 is slidable in a substantially sealed state and a small-diameter CS valve seat 10c with and from which the annular convex portion 54c of the sub-valve body 54 is brought into contact and separated.

Further, a first valve chamber 20 which communicates with the Pd port 12 and in which the side of the left axial end 51a of the primary valve body 51 is disposed, a second valve chamber 30 which communicates with the second Pc port 14 and the side of a right axial end 51f of the primary valve body 51 and the side of a left axial end 54g of the sub-valve body 54 are disposed, a pressure-sensitive chamber 60 which communicates with the first Pc port 13 and in which the side of the pressure-sensitive valve seat 52a of the pressure-sensitive valve member 52, that is, the left side in the axial direction is disposed, and a third valve chamber 40 which communicates with the Ps port 15 and in which the side of the right axial end 54a of the sub-valve body 54 is disposed are formed inside the valve housing 10. Additionally, the second valve chamber 30 is defined by the outer peripheral surfaces of the primary valve body 51 and the sub-valve body 54 and the inner peripheral surface on the right side of the guide surface 10b of the valve housing 10 in the axial direction or on the left side of the CS valve seat 10c in the axial direction. Further, the third valve chamber 40 is defined by the outer peripheral surface of the sub-valve body 54, the left axial end surface of the fixed iron core 82, and the inner peripheral surface on the right side of the CS valve seat 10c of the valve housing 10 in the axial direction.

As illustrated in FIG. 2, the pressure-sensitive body 61 mainly includes a bellows core 62 which has a coil spring 63 embedded therein and the disk-shaped cap 70 which is provided in the right axial end of the bellows core 62 and the left axial end of the bellows core 62 is fixed to the partition adjustment member 11.

Further, the pressure-sensitive body 61 is disposed in the pressure-sensitive chamber 60 and the seal surface 70a of the cap 70 sits on the pressure-sensitive valve seat 52a of the pressure-sensitive valve member 52 by an urging force of moving the cap 70 rightward in the axial direction by the coil spring 63 and the bellows core 62. Further, the cap 70 is configured to apply a force of moving the cap 70 leftward in the axial direction in response to the suction pressure Ps of the intermediate communication path 57.

Figure 3:
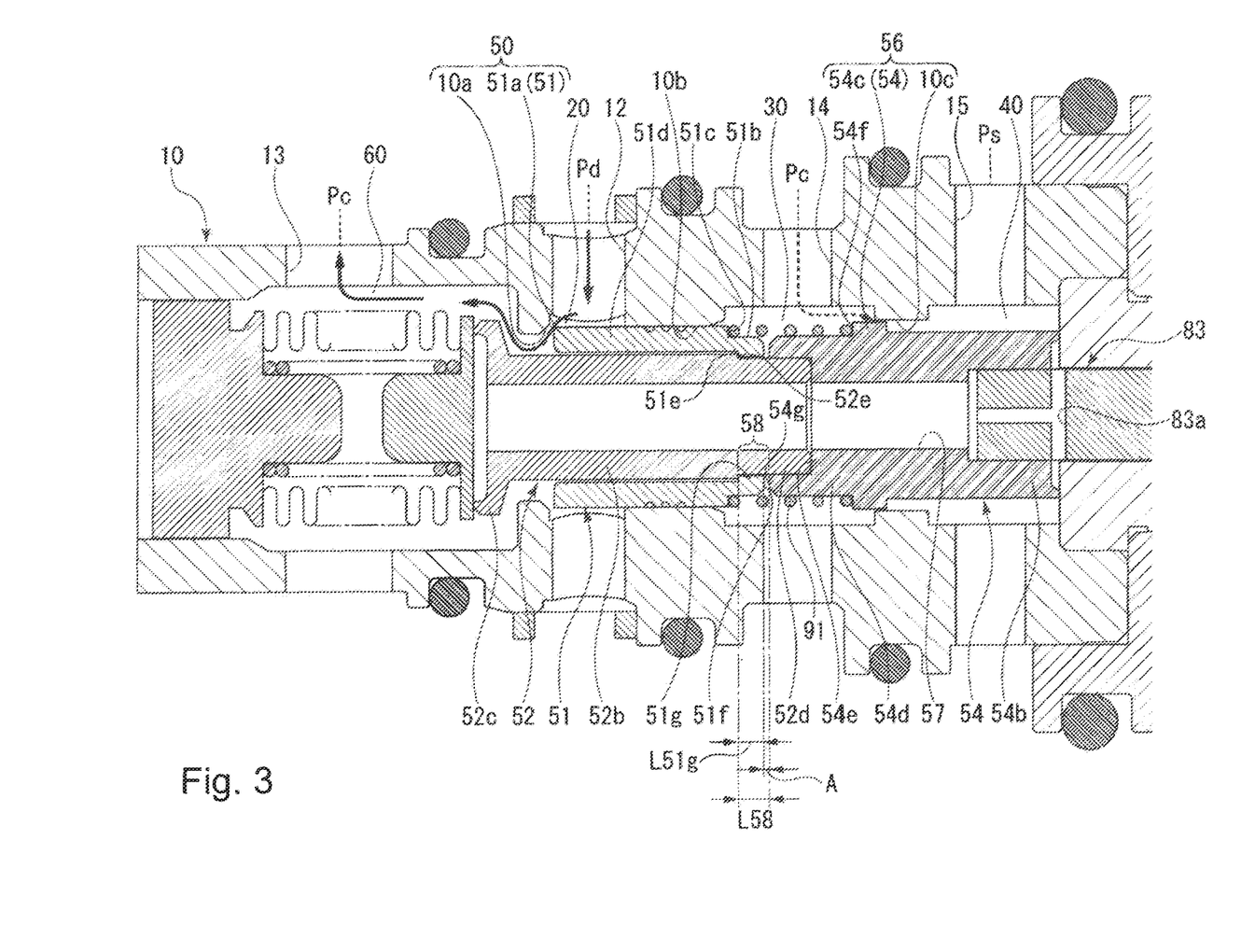
FIG. 3 is an enlarged cross-sectional view of FIG. 2 illustrating a case in which a primary valve is opened and a CS valve is closed in a non-energized state of the capacity control valve of the embodiment.
Figure 4:
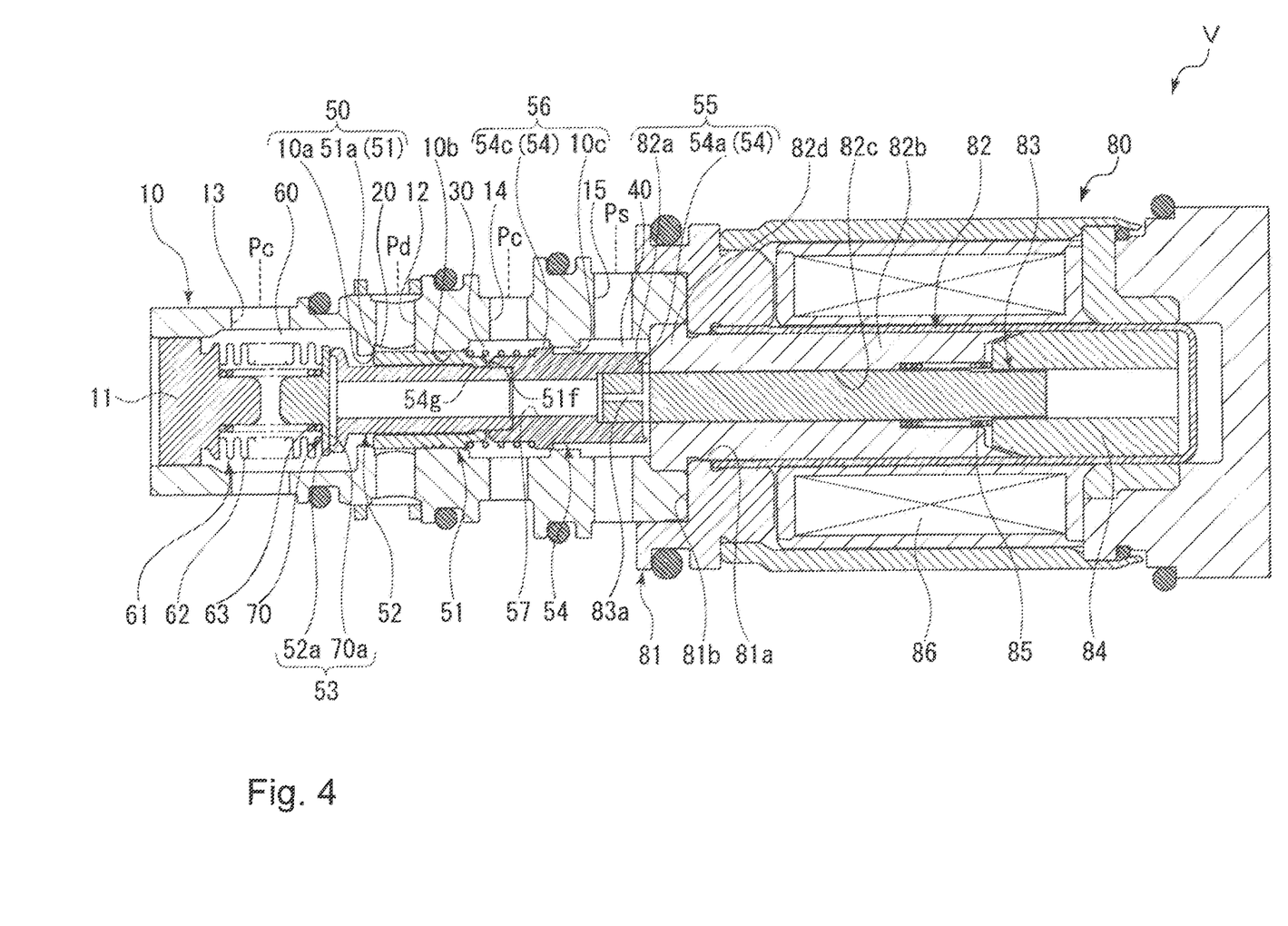
FIG. 4 is a cross-sectional view illustrating a case in which a primary valve is closed and a CS valve is closed in an energized state of the capacity control valve of the embodiment (i.e., during normal control).
Figure 5:
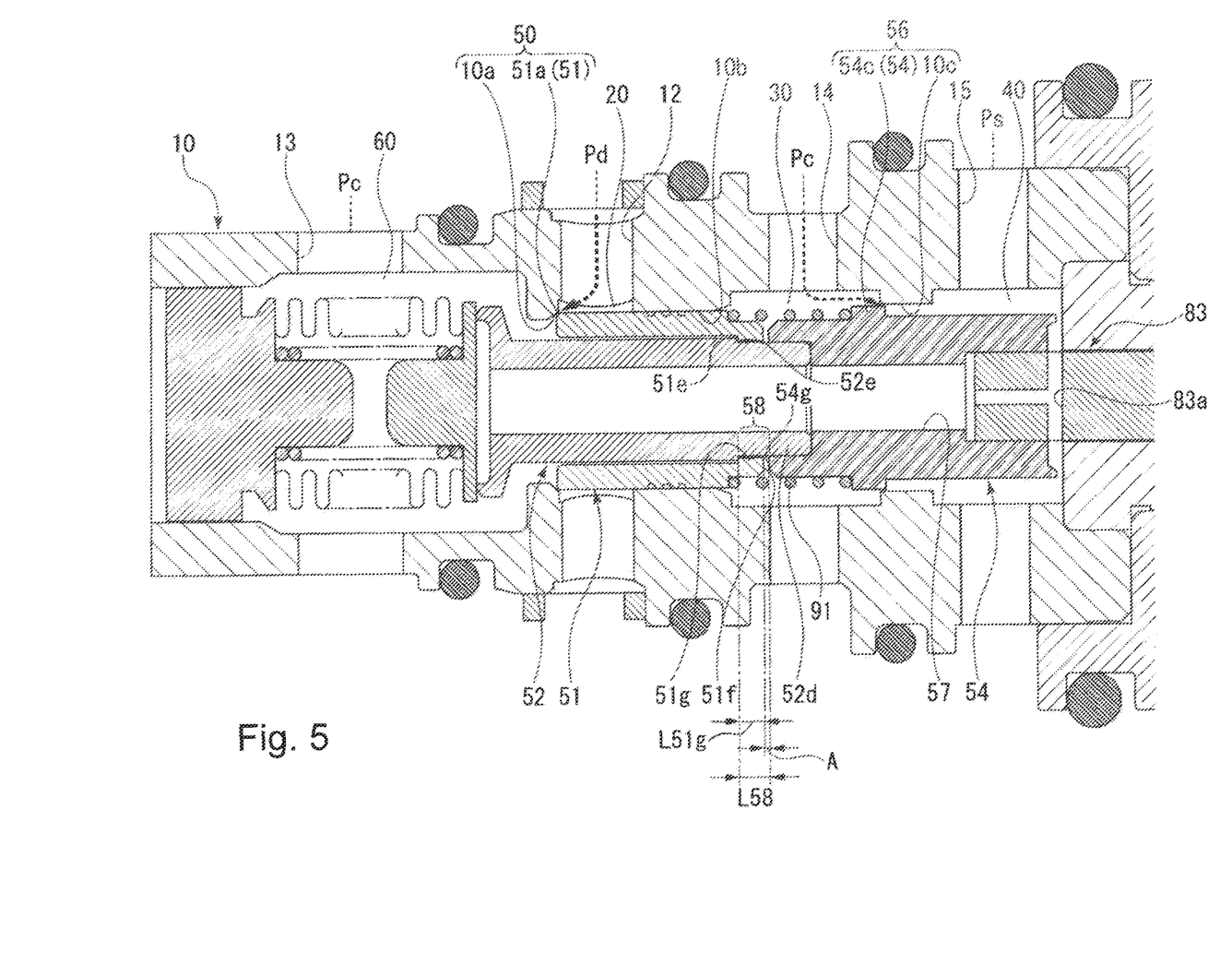
FIG. 5 is an enlarged cross-sectional view of FIG. 4 illustrating a case in which a primary valve is closed and a CS valve is closed in an energized state of the capacity control valve of the embodiment (i.e., during normal control).

As illustrated in FIG. 3, the primary valve body 51 is formed in a stepped cylindrical shape including an attachment portion 51b to which a left axial end portion of a coil spring 91 corresponding to an urging member is externally fitted, an annular surface 51c which extends outward in the radial direction from the left axial end of the attachment portion 51b, and a cylindrical portion 51d which extends from the outer radial side of the annular surface 51c leftward in the axial direction, has a diameter larger than that of the attachment portion 51b, and is provided with the left axial end 51a brought into contact with and separated from the primary valve seat 10a of the valve housing 10. Additionally, the outer peripheral surface of the cylindrical portion 51d and the guide surface 10b of the valve housing 10 are slightly separated from each other in the radial direction so that a minute gap is formed and the primary valve body 51 slides on the valve housing 10 so as to be smoothly and relatively movable in the axial direction.

Further, the inside of the primary valve body 51 is formed in a stepped cylindrical shape in which the dimension of the inner diameter on the side of the cylindrical portion 51d, that is, the left side in the axial direction is larger than that of the side of the attachment portion 51b, that is, the right side in the axial direction and an annular surface 51e which extends outward in the radial direction from the left axial end of the inner peripheral surface of the attachment portion 51b and extends continuously in a perpendicular direction is formed on the substantially right side of the annular surface 51c of the attachment portion 51b in the axial direction. That is, the attachment portion 51b is provided with a hook-shaped locking portion 51g which protrudes inward in the radial direction on the right side in the axial direction.

As illustrated in FIG. 3, the pressure-sensitive valve member 52 is formed in a substantially cylindrical shape and a substantially turret shape in the side view including a cylindrical portion 52b to which the primary valve body 51 is externally fitted and a contact portion 52c which is formed on the left side of the cylindrical portion 52b in the axial direction so as to have a diameter larger than that of the cylindrical portion 52b and is provided with the pressure-sensitive valve seat 52a to and from which the seal surface 70a of the cap 70 constituting the pressure-sensitive body 61 is brought into contact and separated.

Further, an insertion portion 52d which is slightly smaller than the cylindrical portion 52b is formed in the right axial end portion of the cylindrical portion 52b of the pressure-sensitive valve member 52, so that an annular surface 52e which extends outward in the radial direction from the left axial end of the insertion portion 52d is formed. Additionally, the inner peripheral surface of the locking portion 51g of the primary valve body 51 and the outer peripheral surface of the insertion portion 52d of the pressure-sensitive valve member 52 are slightly separated from each other in the radial direction so that a minute gap is formed and the primary valve body 51 and the pressure-sensitive valve member 52 are smoothly and relatively movable in the axial direction in a sliding manner.

As illustrated in FIG. 3, the sub-valve body 54 is formed in a substantially cylindrical shape with a flange including a cylindrical portion 54b which is provided with the right axial end 54a, an annular convex portion 54c which is formed on the left side of the cylindrical portion 54b in the axial direction so as to protrude outward in the radial direction, and an attachment portion 54d which is formed on the left side of the annular convex portion 54c in the axial direction so that the right axial end portion of the coil spring 91 is externally fitted thereto and the diameter is smaller than that of the cylindrical portion 54b. Additionally, the outer diameter of the attachment portion 54d of the sub-valve body 54 is substantially the same as the outer diameter of the attachment portion 51b of the primary valve body 51.

Further, the attachment portion 54d of the sub-valve body 54 is provided with a concave portion 54e of which the inner radial side of the left axial end is recessed rightward in the axial direction and the insertion portion 52d of the pressure-sensitive valve member 52 is inserted and fitted from the left side in the axial direction so that the pressure-sensitive valve member 52 and the sub-valve body 54 are integrally connected and fixed to each other. Additionally, the drive rod 83 is connected and fixed to the right axial end portion of the sub-valve body 54 so that the pressure-sensitive valve member 52, the sub-valve body 54, and the drive rod 83 are integrally moved in the axial direction. Further, the intermediate communication path 57 which penetrates in the axial direction by connecting the hollow holes to each other is formed inside the pressure-sensitive valve member 52 and the sub-valve body 54. Additionally, the intermediate communication path 57 can communicate with the third valve chamber 40 through a communication hole 83a formed in the left axial end portion of the drive rod 83. In addition, for convenience of description, although not illustrated in the drawings, there is a case in which a high-pressure fluid is liquefied in the control chamber 4 when the variable displacement compressor M is stopped and is left for a long time. However, when the variable displacement compressor M is started and the capacity control valve V is energized, the primary valve 50 is closed and the sub-valve 55 is opened so that the pressure-sensitive body 61 is contracted and the pressure-sensitive valve 53 is opened due to the high suction pressure Ps in the intermediate communication path 57. Accordingly, the liquid refrigerant of the control chamber 4 can be discharged to the suction chamber 3 in a short time through the intermediate communication path 57.

Further, the annular convex portion 54c of the sub-valve body 54 moves in a reciprocating manner in the axial direction and changes the overlapping amount with the CS valve seat 10c formed on the inner peripheral surface of the valve housing 10 when viewed from the radial direction, thereby constituting the CS valve 56 that opens and closes a communication between the control fluid having passed through the second Pc port 14 and the suction fluid having passed through the Ps port 15. The CS valve 56 is closed at a position where the annular convex portion 54c and the CS valve seat 10c overlap each other when viewed from the radial direction (see FIGS. 2 to 5). Additionally, the control fluid slightly leaks toward the suction fluid in the closed state of the CS valve 56.

As illustrated in FIG. 3, the left axial end of the coil spring 91 contacts the annular surface 51c of the primary valve body 51 and the right axial end of the coil spring 91 contacts a side surface 54f corresponding to a spring receiving portion on the left side of the annular convex portion 54c of the sub-valve body 54 in the axial direction. That is, the primary valve body 51 is urged in an axial direction opposite to the pressure-sensitive valve member 52 and the sub-valve body 54 by the coil spring 91. Additionally, the coil spring 91 is a compression spring and the outer periphery thereof is separated from the inner peripheral surface of the valve housing 10 in the radial direction.

Further, an annular groove 58 is formed by integrally connecting and fixing the sub-valve body 54 to the insertion portion 52d of the pressure-sensitive valve member 52 while the primary valve body 51 is externally fitted to the cylindrical portion 52b and the insertion portion 52d of the pressure-sensitive valve member 52. The groove 58 is formed by the outer peripheral surface of the insertion portion 52d of the pressure-sensitive valve member 52, the annular surface 52e of the pressure-sensitive valve member 52, and the left axial end 54g corresponding to the contact portion of the sub-valve body 54 and the groove 58 regulates the axial position of the primary valve body 51 with respect to the pressure-sensitive valve member 52 and the sub-valve body 54. Accordingly, the primary valve 50 can be opened in the non-energized state, the primary valve 50 can be closed in the energized state, and the opening degree of the CS valve 56 can be adjusted.

Figure 6:
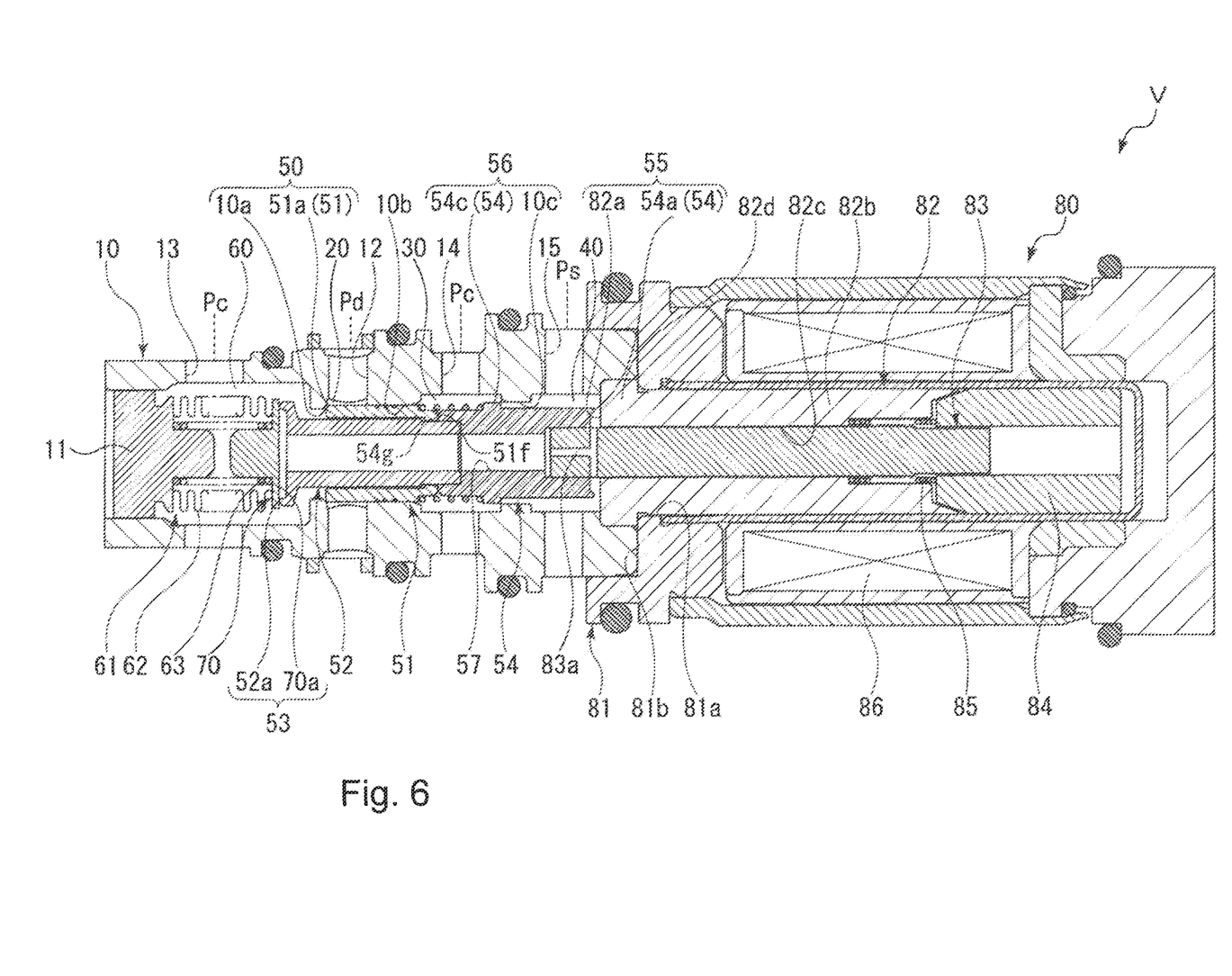
FIG. 6 is a cross-sectional view illustrating a case in which a primary valve is closed and a CS valve is opened in the control in an energized state (e.g., startup state) and a maximum energized state of the capacity control valve of the embodiment.
Figure 7:
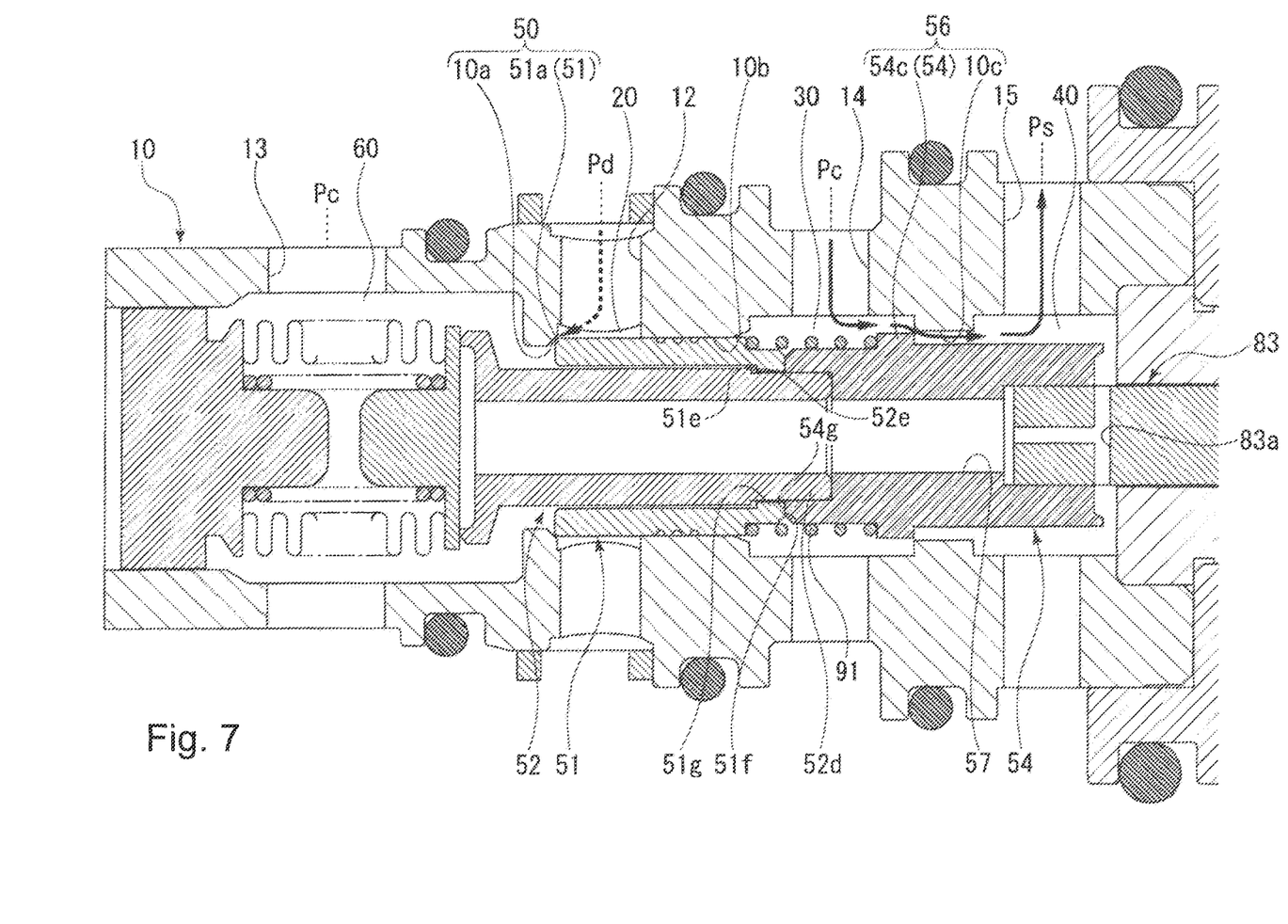
FIG. 7 is an enlarged cross-sectional view of FIG. 6 illustrating a case in which a primary valve is closed and a CS valve is opened in the control in an energized state (e.g., startup state) and a maximum energized state of the capacity control valve of the embodiment.

Specifically, in the energized state, the left axial end 51a of the primary valve body 51 is brought into contact with the primary valve seat 10a so as to close the primary valve 50 and the annular convex portion 54c of the sub-valve body 54 opens the CS valve 56 (see FIGS. 6 and 7). In this state, when the left axial end 54g of the sub-valve body 54 constituting the groove 58 is brought into contact with the right axial end 51f corresponding to the contact portion of the primary valve body 51, it is possible to determine the axial positions of the pressure-sensitive valve member 52 and the sub-valve body 54 with respect to the primary valve body 51 when the CS valve 56 is opened by the annular convex portion 54c. That is, the opening degree of the CS valve 56 can be adjusted and the maximum opening degree can be determined.

Further, a difference between an axial dimension L58 of the groove 58 and an axial dimension L51g of the locking portion 51g of the primary valve body 51 is an axial separation dimension A corresponding to an axial dimension of a gap between the right axial end 51f of the primary valve body 51 and the left axial end 54g of the sub-valve body 54 (i.e., L58−L51g=A, see FIG. 3). That is, the primary valve body 51, the pressure-sensitive valve member 52, and the sub-valve body 54 move together leftward in the axial direction so that the primary valve 50 is closed and then the pressure-sensitive valve member 52 and the sub-valve body 54 are movable in the axial direction by the separation dimension A with respect to the primary valve body 51 (see FIGS. 6 and 7).

Next, the operation of the capacity control valve V and the operation of the opening and closing mechanism of the CS valve 56 in accordance with the axial movement of the primary valve body 51, the pressure-sensitive valve member 52, and the sub-valve body 54 will be described in order of the control in the normal control state, the startup state, and the maximum energized state.

First, the normal control state of the capacity control valve V will be described. The capacity control valve V controls the flow rate of the discharge fluid from the Pd port 12 to the first Pc port 13 by adjusting the opening degree or the opening time of the primary valve 50 during normal control, that is, duty control. At this time, the right side of the annular convex portion 54c of the sub-valve body 54 in the axial direction overlaps the left side of the CS valve seat 10c of the valve housing 10 in the axial direction when viewed from the radial direction and the communication between the control fluid having passed through the second Pc port 14 and the suction fluid having passed through the Ps port 15 is closed by the CS valve 56. In this way, when the CS valve 56 is closed in the normal control state, the flow rate of the flow path connecting the second Pc port 14 and the Ps port 15 is decreased and the control fluid having passed through the second Pc port 14 is prevented from flowing to the Ps port 15. Accordingly, the controllability of the control pressure Pc of the control chamber 4 is excellent and the operation efficiency of the variable displacement compressor M can be improved (see FIGS. 4 and 5). In other words, the opening and closing of the primary valve 50 can be controlled while the CS valve 56 is closed.

Next, the control in the startup state and the maximum energized state will be described. After the variable displacement compressor M is left for a long time in a non-use state, the discharge pressure Pd, the control pressure Pc, and the suction pressure Ps are substantially balanced. As illustrated in FIGS. 2 and 3, when the pressure-sensitive valve member 52 and the sub-valve body 54 are pressed rightward in the axial direction by the urging force of the coil spring 63 constituting the pressure-sensitive body 61 in the non-energized state of the capacity control valve V, the right axial end 54a of the sub-valve body 54 sits on the sub-valve seat 82a of the fixed iron core 82 so that the sub-valve 55 is closed and the left axial end 51*a* of the primary valve body 51 is separated from the primary valve seat 10*a* formed on the inner peripheral surface of the valve housing 10 so that the primary valve 50 is opened. At this time, the annular convex portion 54*c* of the sub-valve body 54 overlaps the CS valve seat 10*c* of the valve housing 10 when viewed from the radial direction and the communication between the control fluid having passed through the second Pc port 14 and the suction fluid having passed through the Ps port 15 is closed by the CS valve 56.

When the capacity control valve V is energized when starting the variable displacement compressor M, the primary valve 50 is closed and the sub-valve 55 is opened. Further, when the capacity control valve V is set to the energized state of the maximum duty, that is, the maximum energized state at the startup, as illustrated in FIGS. 6 and 7, the pressure-sensitive valve member 52 and the sub-valve body 54 are further moved leftward in the axial direction by the separation dimension A (see FIG. 5) with respect to the primary valve body 51. For this reason, the CS valve 56 is opened so that a flow path for discharging a fluid from the second Pc port 14 to the Ps port 15 is formed and the liquefied fluid of the control chamber 4 is discharged in a short time. As a result, the responsiveness at the startup can be improved.

Further, when the variable displacement compressor M is driven with the maximum capacity, the capacity control valve V is set to the energized state of the maximum duty, that is, the maximum energized state similarly to the startup state. Accordingly, since the primary valve 50 is closed and the CS valve 56 is opened so that the second Pc port 14 can communicate with the Ps port 15, the control pressure Pc and the suction pressure Ps can be easily maintained at the equal pressure (the same pressure) state by sufficiently decreasing the control pressure Pc. For that reason, since the maximum capacity state is maintained by stabilizing the stroke of the piston 7 in the cylinder 4*a* of the control chamber 4, the operation efficiency can be improved.

Further, since the annular surface 51*e* of the locking portion 51*g* is locked to the annular surface 52*e* of the pressure-sensitive valve member 52 in the primary valve body 51, the primary valve body 51 can be accurately positioned with respect to the pressure-sensitive valve member 52 and the sub-valve body 54 in the axial direction. Further, the attachment accuracy of the primary valve body 51 with respect to the pressure-sensitive valve member 52 can be improved.

Further, since the CS valve 56 is formed in a spool valve structure by the annular convex portion 54*c* of the sub-valve body 54 and the CS valve seat 10*c* formed on the inner peripheral surface of the valve housing 10, the CS valve 56 is closed when the pressure-sensitive valve member 52 and the sub-valve body 54 stroke by a predetermined amount or more in the axial direction and hence the CS valve 56 can be reliably closed. Further, since the CS valve 56 is maintained in the closed state even when the pressure-sensitive valve member 52 and the sub-valve body 54 are slightly moved in the axial direction due to disturbances such as vibration, for example, during normal control, the capacity control valve V is strong against disturbance and has excellent control accuracy.

Further, since the inner peripheral surface of the locking portion 51*g* slides on the outer peripheral surface of the insertion portion 52*d* of the pressure-sensitive valve member 52 and the outer peripheral surface of the cylindrical portion 51*d* slides on the guide surface 10*b* of the valve housing 10 in the primary valve body 51, the relative movement of the primary valve body 51 with respect to the pressure-sensitive valve member 52 and the sub-valve body 54 in the axial direction can be stabilized.

Further, since the sub-valve body 54 is provided with the side surface 54*f* which is on the left side of the annular convex portion 54*c* in the axial direction and is brought into contact with the right axial end of the coil spring 91, the primary valve body 51, the pressure-sensitive valve member 52, and the sub-valve body 54 can have a simple slide structure.

Further, since the primary valve body 51, the pressure-sensitive valve member 52, and the sub-valve body 54 are separate members and the relative movement of the primary valve body 51 with respect to the pressure-sensitive valve member 52 and the sub-valve body 54 in the axial direction is regulated by the left axial end 54*g* of the sub-valve body 54, the primary valve body 51, the pressure-sensitive valve member 52, and the sub-valve body 54 can have a simple slide structure.

Further, since the valve housing 10 is provided with the first Pc port 13 disposed in the pressure-sensitive chamber 60 so as to correspond to the pressure-sensitive valve 53 and the second Pc port 14 disposed in the second valve chamber 30 so as to correspond to the CS valve 56, it is not necessary to form a flow path for circulating the control fluid inside the valve housing 10 and the structure can be simplified.

Further, when the suction pressure Ps becomes a high pressure due to abnormality or the like, the sub-valve body 54 is pressed leftward by the suction pressure Ps to open the CS valve 56. Accordingly, the high-pressure suction pressure can be released from the second Pc port 14.

Figure 8:
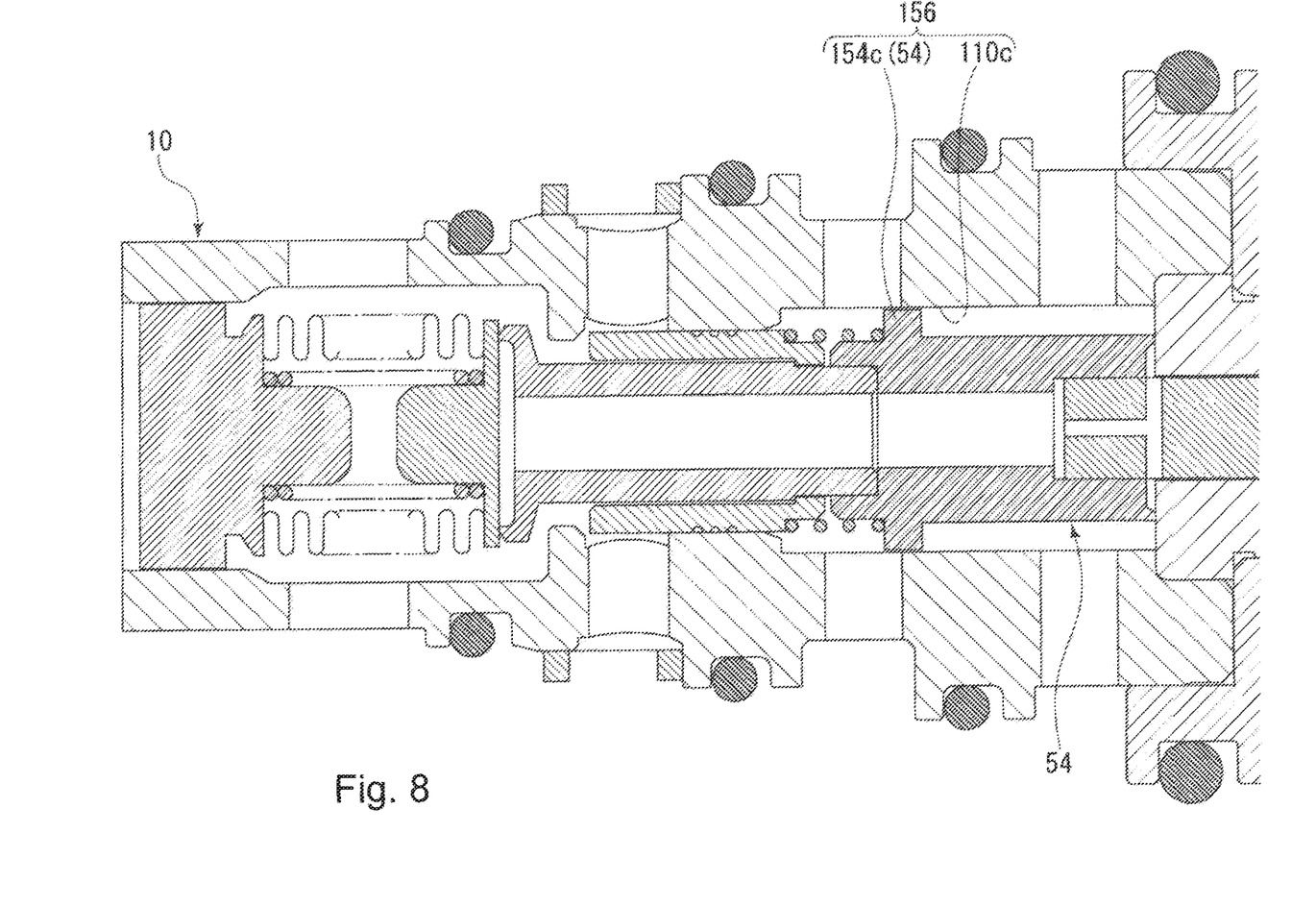
FIG. 8 is an enlarged cross-sectional view illustrating a case in which a primary valve is opened and a CS valve is closed in a non-energized state of a capacity control valve of a modified example of the embodiment.

Further, an example in which the CS valve 56 includes the annular convex portion 54*c* of the sub-valve body 54 and the CS valve seat 10*c* of the inner peripheral surface of the annular protrusion of the valve housing 10 has been described. However, as illustrated in FIG. 8, the inner peripheral surface of the valve housing 10 may not be provided with the protrusion and the inner peripheral surface may be disposed so that an annular convex portion 154*c* of the sub-valve body 54 partially overlaps the second Pc port 14 as the CS valve seat 110*c* when viewed from the radial direction. In this way, the valve housing 10 is simply manufactured and there is no possibility that the sub-valve body 54 is tilted due to a tilt load or the like so that the annular convex portion 154*c* of the sub-valve body 54 engages with the annular protrusion of the valve housing 10.

Although the embodiments of the present invention have been described above with reference to the drawings, a detailed configuration is not limited to these embodiments and modifications or additions in the scope not departing from the spirit of the present invention are also included in the present invention.

For example, in the above-described embodiment, an example in which the flow path from the second Pc port 14 to the Ps port 15 is narrowed by closing the CS valve 56 has been described, but the invention is not limited thereto. That is, the diameter dimensions of the annular convex portion 54*c* of the sub-valve body 54 and the CS valve seat 10*c* of the valve housing 10 may be set so as to substantially interrupt the flow path from the second Pc port 14 to the Ps port 15 by closing the CS valve 56.

Further, an example in which the pressure-sensitive valve member 52 and the sub-valve body 54 are formed as separate members has been described, but both members may be integrated with each other.

Further, a fixed orifice and a communication path directly communicating the control chamber 4 of the variable displacement compressor M with the suction chamber 3 may not be provided.

Further, in the above-described embodiment, the sub-valve may not be provided and the right axial end of the sub-valve body does not need to have a sealing function when the right axial end functions as a support member that receives an axial load.

Further, the coil spring 91 is not limited to a compression spring, but may be a tension spring or may have a shape other than a coil shape.

Further, an example in which the CS valve 56 includes the valve housing 10 and the sub-valve body 54 has been described, but a separate member may be attached to the valve housing 10 or the sub-valve body 54.

Further, the pressure-sensitive body 61 may not use a coil spring therein.

REFERENCE SIGNS LIST

1 Casing
2 Discharge chamber
3 Suction chamber
4 Control chamber
10 Valve housing
10a Primary valve seat
10b Guide surface
10c CS valve seat
11 Partition adjustment member
12 Pd port (discharge port)
13 First Pc port (control port, first control port)
14 Second Pc port (control port, second control port)
15 Ps port (suction port)
20 First valve chamber
30 Second valve chamber
40 Third valve chamber
50 Primary valve
51 Primary valve body
51a Left axial end
51b Attachment portion
51c Annular surface
51d Cylindrical portion
51e Annular surface
51f Right axial end (contact portion)
51g Locking portion
52 Pressure-sensitive valve member (rod)
52a Pressure-sensitive valve seat
52b Cylindrical portion
52c Contact portion
52d Insertion portion
52e Annular surface
53 Pressure-sensitive valve (pressure drive valve)
54 Sub-valve body (rod)
54a Right axial end
54b Cylindrical portion
54c Annular convex portion
54d Attachment portion
54e Concave portion
54f Side surface (spring receiving portion)
54g Left axial end (contact portion)
55 Sub-valve
56 CS valve
57 Intermediate communication path (hollow communication path)
58 Groove
60 Pressure-sensitive chamber
61 Pressure-sensitive body
62 Bellows core
63 Coil spring
70 Cap
70a Seal surface
80 Solenoid
82 Fixed iron core
82a Sub-valve seat
83 Drive rod
91 Coil spring (urging member)
Pc Control pressure
Pd Discharge pressure
Ps Suction pressure
V Capacity control valve

The invention claimed is:

1. A capacity control valve comprising:
a valve housing provided with a discharge port allowing a discharge fluid of a discharge pressure to pass therethrough, a suction port allowing a suction fluid of a suction pressure to pass therethrough, and a control port allowing a control fluid of a control pressure to pass therethrough, a drive rod driven by a solenoid, and a primary valve including a primary valve seat and a primary valve body;
the primary valve body opening and closing a communication between the discharge port and the control port by the movement of the drive rod, the capacity control valve further comprising:
a CS valve includes a sub-valve body connected to and driven by the drive rod, where the sub-valve body and opens and closes a communication between the control port and the suction port; and
an urging member configured to urge the primary valve body and the drive rod in opposite directions,
wherein the sub-valve body is disposed between the primary valve body and the drive rod such that the primary valve body is driven by the drive rod via the sub-valve body, and
wherein the primary valve body and the drive rod are disposed so as to be relatively movable in an axial direction, and the sub-valve body is provided with a spring receiving portion with which one end of the urging member is brought into contact.

2. The capacity control valve according to claim 1, wherein an outer periphery of the primary valve body slides on the valve housing.

3. The capacity control valve according to claim 1, further comprising:
a pressure drive valve which is opened and closed by the suction pressure,
wherein the sub-valve body and a valve member of the pressure drive valve are each provided with a hollow communication path capable of causing the control port to communicate with the suction port by opening and closing the pressure drive valve.

4. The capacity control valve according to claim 1, wherein the control port includes a first control port and a second control port, and
wherein the suction port, the second control port, the discharge port, and the first control port are sequentially disposed from a side of the solenoid.

5. The capacity control valve according to claim 1, wherein the primary valve body is provided with a locking portion configured to lock a relative movement of the drive rod with respect to the primary valve body in the axial direction.

6. The capacity control valve according to claim 5, wherein the CS valve is a spool valve structure.

7. The capacity control valve according to claim 5, wherein each of the primary valve body and the sub-valve body are provided with a contact portion which contacts in the axial direction.

8. The capacity control valve according to claim 5, wherein an outer periphery of the primary valve body slides on the valve housing.

9. The capacity control valve according to claim 5, further comprising:
a pressure drive valve which is opened and closed by the suction pressure, wherein the sub-valve body and a valve member of the pressure drive valve are each provided with a hollow communication path capable of causing the control port to communicate with the suction port by opening and closing the pressure drive valve.

10. The capacity control valve according to claim 5, wherein the control port includes a first control port and a second control port, and
wherein the suction port, the second control port, the discharge port, and the first control port are sequentially disposed from a side of the solenoid.

11. The capacity control valve according to claim 1, wherein the CS valve is a spool valve structure.

12. The capacity control valve according to claim 11, wherein each of the primary valve body and the sub-valve body are provided with a contact portion which contacts in the axial direction.

13. The capacity control valve according to claim 11, wherein an outer periphery of the primary valve body slides on the valve housing.

14. The capacity control valve according to claim 11, further comprising:
a pressure drive valve which is opened and closed by the suction pressure,
wherein the sub-valve body and a valve member of the pressure drive valve are each provided with a hollow communication path capable of causing the control port to communicate with the suction port by opening and closing the pressure drive valve.

15. The capacity control valve according to claim 11, wherein the control port includes a first control port and a second control port, and
wherein the suction port, the second control port, the discharge port, and the first control port are sequentially disposed from a side of the solenoid.

16. The capacity control valve according to claim 1, wherein each of the primary valve body and the sub-valve body are provided with a contact portion which contacts in the axial direction.

17. The capacity control valve according to claim 16, wherein an outer periphery of the primary valve body slides on the valve housing.

* * * * *

UNITED STATES PATENT AND TRADEMARK OFFICE
CERTIFICATE OF CORRECTION

| | |
|---|---|
| PATENT NO. | : 11,536,257 B2 |
| APPLICATION NO. | : 17/256959 |
| DATED | : December 27, 2022 |
| INVENTOR(S) | : Hayama et al. |

It is certified that error appears in the above-identified patent and that said Letters Patent is hereby corrected as shown below:

In the Claims

Claim 1, Column 14, Line 31, "sub-valve body and" should be --sub-valve body--.

Signed and Sealed this
Eighth Day of October, 2024

Katherine Kelly Vidal
*Director of the United States Patent and Trademark Office*